United States Patent
Elboim et al.

(10) Patent No.: US 11,176,435 B2
(45) Date of Patent: Nov. 16, 2021

(54) SYSTEM AND METHOD FOR TESTING ENERGY HARVESTING INTERNET OF THINGS (IOT) TAGS

(71) Applicant: Wiliot, LTD., Caesarea (IL)

(72) Inventors: Yaron Elboim, Haifa (IL); Nir Shapira, Raanana (IL)

(73) Assignee: Wiliot Ltd., Caesarea (IL)

( * ) Notice: Subject to any disclaimer, the term of this patent is extended or adjusted under 35 U.S.C. 154(b) by 0 days.

(21) Appl. No.: 16/782,379

(22) Filed: Feb. 5, 2020

(65) Prior Publication Data
US 2020/0251228 A1  Aug. 6, 2020

Related U.S. Application Data

(60) Provisional application No. 62/801,463, filed on Feb. 5, 2019.

(51) Int. Cl.
  *G16Y 30/00* (2020.01)
  *G06K 7/00* (2006.01)
  *G06K 19/07* (2006.01)

(52) U.S. Cl.
  CPC ....... *G06K 19/0701* (2013.01); *G06K 7/0008* (2013.01); *G16Y 30/00* (2020.01)

(58) Field of Classification Search
  None
  See application file for complete search history.

(56) References Cited

U.S. PATENT DOCUMENTS

| | | | | |
|---|---|---|---|---|
| 5,294,931 A * | 3/1994 | Meier | ................... | G01S 13/758 342/44 |
| 6,035,677 A * | 3/2000 | Janssen | ................... | E05B 19/04 70/278.3 |
| 6,104,291 A | 8/2000 | Beauvillier et al. | | |
| 6,184,777 B1 * | 2/2001 | Mejia | ................... | G06K 7/0008 340/10.1 |
| 6,459,282 B1 * | 10/2002 | Nakamura | ........... | G01R 31/307 324/754.21 |
| 6,946,950 B1 * | 9/2005 | Ueno | ................... | G06K 7/0008 340/10.1 |
| 7,102,517 B2 * | 9/2006 | Reyes | ................... | G06K 7/0095 340/10.1 |
| 7,164,353 B2 | 1/2007 | Puleston et al. | | |
| 7,178,416 B2 | 2/2007 | Whelan et al. | | |
| 7,225,992 B2 | 6/2007 | Forster | | |
| 7,477,152 B2 * | 1/2009 | Forster | ............... | G01R 31/3025 340/572.1 |
| 7,604,177 B2 * | 10/2009 | Konuma | ........... | G06K 19/0723 235/492 |
| 8,010,219 B2 * | 8/2011 | Martinez | ........... | G06K 19/07718 700/112 |

(Continued)

*Primary Examiner* — Chico A Foxx
(74) *Attorney, Agent, or Firm* — M&B IP Analysts, LLC

(57) ABSTRACT

A system and method for method for testing an energy harvesting tag, comprising: transmitting a harvesting signal to an energy harvesting tag at time $T_1$; receiving a response signal from the energy harvesting tag at time $T_2$; determining a capacitor charging time of the energy harvesting tag as a difference between $T_2$ and $T_1$; and assigning a pass value to the energy harvesting tag when the capacitor charging time is less than a predetermined threshold amount.

20 Claims, 7 Drawing Sheets

(56) References Cited

U.S. PATENT DOCUMENTS

| | | | | |
|---|---|---|---|---|
| 8,627,170 B2* | 1/2014 | Ito | H03M 13/09 | |
| | | | 714/758 | |
| 9,159,012 B2* | 10/2015 | Downie | G06K 19/0717 | |
| 9,432,132 B2* | 8/2016 | Tuominen | G06K 7/0008 | |
| 10,158,401 B2* | 12/2018 | Hull | H04B 5/0062 | |
| 10,720,036 B2* | 7/2020 | Ellers | G08B 13/2434 | |
| 2002/0120302 A1* | 8/2002 | Lyden | A61N 1/3708 | |
| | | | 607/9 | |
| 2005/0052287 A1* | 3/2005 | Whitesmith | G01S 13/751 | |
| | | | 340/13.26 | |
| 2005/0242921 A1* | 11/2005 | Zimmerman | G07C 9/00309 | |
| | | | 340/5.2 | |
| 2005/0252979 A1* | 11/2005 | Konuma | G06K 19/0716 | |
| | | | 235/492 | |
| 2005/0271416 A1* | 12/2005 | Kinoshita | G03G 15/0216 | |
| | | | 399/129 | |
| 2006/0093312 A1* | 5/2006 | Park | G11B 20/10 | |
| | | | 386/240 | |
| 2006/0202831 A1* | 9/2006 | Horch | H01L 23/5227 | |
| | | | 340/572.7 | |
| 2007/0213951 A1* | 9/2007 | Van Eeden | G06K 7/0008 | |
| | | | 702/116 | |
| 2007/0220737 A1* | 9/2007 | Stoughton | G11C 29/006 | |
| | | | 29/593 | |
| 2009/0184165 A1* | 7/2009 | Bertness | H01M 50/116 | |
| | | | 235/462.01 | |
| 2010/0207729 A1 | 8/2010 | Ko et al. | | |
| 2010/0214080 A1* | 8/2010 | Alexis | G06K 17/00 | |
| | | | 340/10.51 | |
| 2011/0052792 A1* | 3/2011 | Shin | H01C 17/065 | |
| | | | 427/8 | |
| 2011/0074582 A1* | 3/2011 | Alexis | G08B 13/149 | |
| | | | 340/572.1 | |
| 2012/0193433 A1* | 8/2012 | Chang | G06K 19/08 | |
| | | | 235/492 | |
| 2012/0274448 A1* | 11/2012 | Marcus | G06K 19/0722 | |
| | | | 340/10.1 | |
| 2013/0342323 A1* | 12/2013 | Hinman | G06K 7/10079 | |
| | | | 340/10.1 | |
| 2015/0015366 A1* | 1/2015 | Hoffman | G06F 11/3409 | |
| | | | 340/5.61 | |
| 2015/0056918 A1* | 2/2015 | Tuominen | G06K 7/10465 | |
| | | | 455/41.1 | |
| 2016/0284185 A1* | 9/2016 | Maison | G06Q 10/0833 | |
| 2017/0116443 A1* | 4/2017 | Bolic | H02J 50/90 | |
| 2018/0137316 A1* | 5/2018 | Fischer | G06K 7/10366 | |
| 2018/0225486 A1* | 8/2018 | Teruyama | H04W 76/14 | |
| 2018/0341840 A1* | 11/2018 | Uemura | G06K 15/407 | |
| 2019/0118382 A1* | 4/2019 | Gu | H02J 7/025 | |
| 2019/0147646 A1* | 5/2019 | Fan | G06T 17/05 | |
| | | | 340/539.13 | |
| 2019/0156170 A1* | 5/2019 | Zalbide Aguirrezabalaga | | |
| | | | G06K 19/0704 | |

* cited by examiner

SYSTEM AND METHOD FOR TESTING ENERGY HARVESTING INTERNET OF THINGS (IOT) TAGS

CROSS-REFERENCE TO RELATED APPLICATIONS

This application claims the benefit of U.S. Provisional Application No. 62/801,463 filed on Feb. 5, 2019, the contents of which are hereby incorporated by reference.

TECHNICAL FIELD

The present disclosure relates generally to Internet of things (IoT) tags, and more specifically to testing energy harvesting tags of IoT devices to determine accuracy and functionality of the tag elements.

BACKGROUND

The Internet of things (IoT) is the inter-networking of physical devices, vehicles, buildings, and other items embedded with electronics, software, sensors, actuators, and network connectivity that enable these objects to collect and exchange data. IoT is expected to offer advanced connectivity of devices, systems, and services that goes beyond machine-to-machine (M2M) communications and covers a variety of protocols, domains, and applications.

IoT can be encapsulated in a wide variety of devices, such as heart monitoring implants; biochip transponders on farm animals; automobiles with built-in sensors; automation of lighting, heating, ventilation, air conditioning (HVAC) systems; and appliances such as washer/dryers, robotic vacuums, air purifiers, ovens or refrigerators/freezers that use Wi-Fi for remote monitoring. Typically, IoT devices encapsulate wireless sensors or a network of such sensors.

Most IoT devices are wireless devices that collect environmental data and transmit such data to a central controller. There are a few requirements to be met to allow widespread deployment of IoT devices, including reliable communication, low energy consumption, and low maintenance costs. To ensure that each IoT device operates as intended, a tag used to provide connectivity and IoT functionality within each device, such as a wireless IoT tag, must be tested during production to determine if it operates within its intended parameters.

To reduce the cost and increase efficiency of production, IoT tags may be assembled on an inlay surface, where various tag elements are etched onto the inlay. This method provides a more cost effective and less labor-intensive assembly than employing traditional printed circuit board (PCB) design, which requires soldering together multiple components on each tag. During an assembly process of such tags, a non-passive circuitry (e.g., chip) is attached to the inlay of the tag. An IoT tag may additionally include several antennas etched onto the inlay and well as a memory component, e.g., a nonvolatile memory (NVM) used to store data.

Some of the antennas are used for radio frequency (RF) energy harvesting, while additional antennas are used for transmission (TX) and reception (RX) of RF communication signals. In other configurations, one or more antennas can be used for both harvesting and TX and/or RX. Energy harvesting allows an IoT tag to operate without relying on a battery source or other external power supply by using over-the-air signals to charge a capacitor. The antennas used for energy harvesting require precise construction for optimal tag implementation.

To ensure that the IoT tags perform as expected, and in particular that each tag can be charged using over the air signals, the tags may be tested during two phases, pre and post assembly, where the testing can be performed in either a static or a dynamic mode. In the static mode, the tags being tested are stationary, where a testing probe may or may not move relative to the tags. In the dynamic mode, the tags are placed on a moving surface, such as a conveyer belt, and are transported along the belt at a specific speed (e.g., 10 meters per minute), where the tags move relative to the testing probe. In both modes, the accuracy and functionality of the tags must be determined to ensure that the tag functions as intended, e.g., with an outcome of the test as either a pass or a fail.

Many of the IoT tags used in IoT devices are generated at a mass-production level, requiring that the testing of such tags be performed accurately at scale within acceptable time constraints.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for testing an energy harvesting tag, including: transmitting a harvesting signal to an energy harvesting tag at time $T_1$; receiving a response signal from the energy harvesting tag at time $T_2$; determining a capacitor charging time of the energy harvesting tag as a difference between $T_2$ and $T_1$; and assigning a pass value to the energy harvesting tag when the capacitor charging time is less than a predetermined threshold amount.

Certain embodiments disclosed herein also include a system for testing an energy harvesting tag, including: a transmitter configured to transmit a harvesting signal; a receiver configured to receive a response signal; a processing circuitry; and a memory, the memory containing instructions that, when executed by the processing circuitry, configure the system to: transmit the harvesting signal to an energy harvesting tag at time $T_1$; receive the response signal from the energy harvesting tag at time $T_2$; determine a capacitor charging time of the energy harvesting tag as a difference between $T_2$ and $T_1$; and assign a pass value to the energy harvesting tag when the capacitor charging time is less than a predetermined threshold amount.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
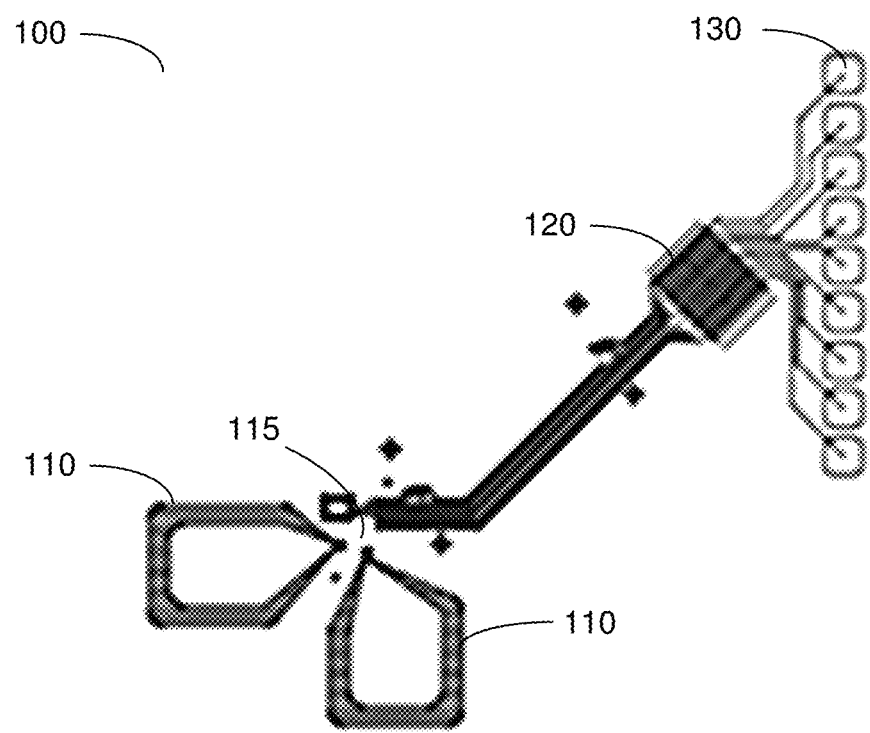
FIG. 1 is an example diagram of an IoT tag according an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 shows an example diagram of an IoT tag 100 according an embodiment. The IoT tag 100 includes at least two antennas 110 connected to an integrated circuit, or chip, (not shown, but which is placed at the vertices 115 of the antennas during assembly). In an example embodiment, the antennas 110 are loop antennas.

As shown, the antennas 110 are also connected to test connector pads 120 and 130, which may be removed later during production. The loop antennas 110 feature an inductive impedance at the interface of the antenna, and a capacitor (not shown), either as an independent component of the IoT tag 100, or as part of the chip placed at 115, as further discussed below in FIG. 2.

Figure 2:
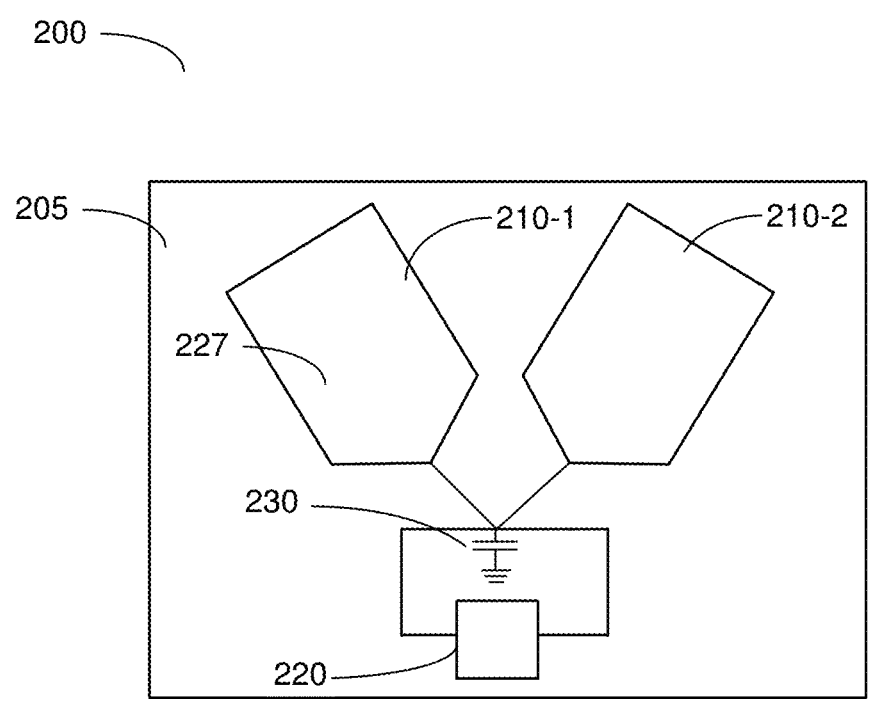
FIG. 2 is a schematic diagram of an IoT tag according to an embodiment.

FIG. 2 is a schematic diagram of an IoT tag 200 according to an embodiment. The IoT tag 200 includes an integrated circuit (IC, or chip) 220 and at least one antenna 210-1, 210-2 placed on an inlay 205. In an embodiment, the inlay 205 is a single layer inlay that includes the integrated circuit 220 connected to the at least one antenna 210-1, 210-2 and may be mounted on a substrate (not shown). The substrate is a single layer material, which may be a single metal layer or any appropriate integrated circuit mounting material, such as a printed circuit board (PCB), silicon, flexible printed circuits (FPC), low temperature co-fired ceramic (LTCC), polyethylene terephthalate (PET), paper, and the like.

In an example embodiment, the IoT tag 200 includes a pair of antennas 210-1 and 210-2 that are etched within the inlay 205. The first antenna 210-1 is utilized to harvest energy from ambient RF signals and the second antenna 210-2 is utilized to transmit signals, such as Bluetooth Low Energy (BLE) signals. Each antenna 210-1, 210-2 may be of a type including a loop antenna, a big loop with two feeds, a dipole antenna with two transformer feeds, and similar configurations. It should be noted that the transmitting antenna 210-2 may be utilized to harvest energy as well.

Further, in some configurations, a plurality of antennas may be used to harvest energy, each of which is designed to receive signals of different frequencies.

In an embodiment, the IoT tag 200 also includes a capacitor 230 that may be realized as an on-die capacitor, an external passive capacitor, and the like. The energy harvesting functionality is performed by the integrated circuit 220.

In order to ensure that the IoT tag 200 can operate accurately, the harvesting frequency of the harvesting antenna 210-1 should be tested to determine if it falls within acceptable parameters that enable charging of the capacitor 230 within a predetermined timeframe. In an embodiment, the testing requires determining if each individual IoT tag 200 is capable of receiving signals, harvesting energy, charging a capacitor, and sending signals.

Because the IoT tag 200 is often configured to operate efficiently using a minimal amount of power available from energy harvesting, the effective operating frequency range of the IoT tag 200 is limited. Determining if a tag operates successfully within a set frequency range is crucial in evaluating whether a particular tag is capable of performing as desired.

The harvesting antenna 210-1 of the IoT tag 200 receives energy over RF signals at one or more frequency bands. Such bands are specific to the parameters of that tag, which include, but are not limited to, physical parameters such as antenna length, thickness, conductivity, resistivity, and antenna properties, such as gain, radiation pattern, beam width, polarization, impedance, and the like. It should be noted that even minute differences or shifts between the parameters of two antennas may result in a different harvesting frequency.

Based on the harvesting frequency, the harvesting antenna 210-1 of an IoT tag 200 is tuned to a frequency band where the IoT tag can most efficiently receive and transform RF signals received over that band into a DC voltage. In an embodiment, the DC voltage is stored on the capacitor 230, or on a similar power storage device.

The energy E on the capacitor 230 is related to the DC voltage V by the following equation: $E=\frac{1}{2}CV^2$, where C is the capacitance of the capacitor. As discussed above, the inlay 205 of the IoT tag 220 may include multiple antennas, where more than one antenna may be configured as a separate harvester. In an embodiment, each harvester is connected to a separate storage capacitor, while in a further embodiment, a single storage capacitor is common to multiple harvesters, allowing for an increased shared storage capacity for the IoT tag 200.

Figure 3:
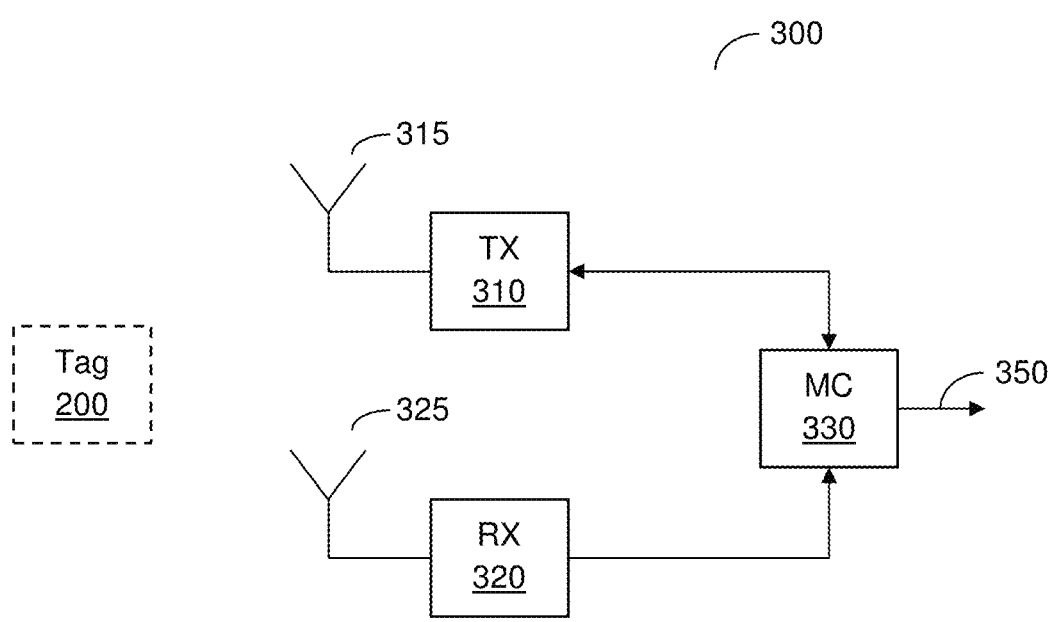
FIG. 3 is a schematic diagram of a tester of an IoT tag testing machine according to an embodiment.

FIG. 3 is a schematic diagram of a tester 300 configured to test the functionality of IoT tags 200 according to an embodiment. The tested IoT tags 200 are battery-free IoT tags, such as the IoT tag 200 discussed in the above examples of FIGS. 1 and 2.

In an embodiment, the tester 300 is configured to determine if an IoT tag 200 operates as expected, and may be integrated within a machine that assembles IoT tags. Such assembling includes etching, placing, or gluing the antennas and integrated circuits on the inlay of an IoT tag 200. The tester 300 may operate as part of a static or a dynamic testing procedure, as further discussed below in FIG. 4.

In an example embodiment, the tester 300 includes a transmitter 310 connected to a transmitting antenna 315, and a receiver 320 connected to a receiving antenna 325. Both the transmitter 310 and the receiver 320 are each further connected to a microcontroller 330.

The transmitter 310 is configured to transmit harvesting signals to an IoT tag 200, where the IoT tag 200 is configured to use the harvesting signal to charge a capacitor using the harvesting antennas of the IoT tag 200. In an embodiment, the harvesting signals transmitted by the transmitter 315 may include wireless signals such as BLE®, FM radio, cellular, Bluetooth®, LoRa, Wi-Fi®, nRF, DECT®, Zigbee®, Z-Wave®, EnOcean®, and the like. A BLE signal is a signal within the 2.4 GHz radio frequency that is used with low power consumption devices, such as battery-less IoT tags.

In a further embodiment, the transmitter 310 is configured to transmit multiple different signals, e.g., a BLE signal and an FM radio signal, simultaneously to one or more IoT tags 200. In an embodiment where the transmitter 310 is configured to transmit signals at different bands, the transmitter 310 may receive instructions from the microcontroller 330 indicating which type of signal is to be transmitted to one or more IoT tags, and the timeframe in which they are transmitted.

In a further embodiment, the tester 300 is configured to transmit signals with different frequencies to adjacent IoT tags (not shown in FIG. 3). For example, if multiple IoT tags 200 are being tested at the same time, adjacent IoT tags are each sent unique signals from the transmitter 310 to minimize residual signals which may cause interference and inaccurate testing results caused by transmitted signals intended for the testing of a different tag.

In an embodiment, the tester 300 is configured to test several harvesting antennas connected to a single storage capacitor individually, where the transmission of an RF harvesting signal and the measurement of a capacitor charging time is performed one antenna at a time. The several harvesting antennas may belong to a single IoT tag or to multiple IoT tags. In such a scenario, the tester 300 is configured to discharge the capacitor between charges to allow for an accurate measurement of each antenna.

The transmitter 310 is configured to send a timestamp to the microcontroller 330 identifying when each of the transmitted signals is sent to the IoT tag 200. This timestamp is identified as $T_1$. The transmitter 310 may be further configured to confirm the type of signal sent to the IoT tag 200 by sending a confirmation message to the microcontroller 330 identifying the type of signal sent, e.g., the power of a signal and the exact frequency used.

In an embodiment, the receiver 320 is configured to receive a BLE signal (packet) sent from the IoT tag 200 and determine a time of receipt, identified as $T_2$. Such a packet may be received over a BLE advertising channel. The IoT tag 200 is configured such that a response signal, i.e., the BLE signal, is transmitted from the IoT tag 200 to the tester 300 when the capacitor is charged to a sufficient level to power the transmission itself.

The charging time of the capacitor to reach such a level is defined as $T_2-T_1$, and is determined by the microcontroller 330. As discussed further below in FIGS. 6 and 7, the charging time is used to determine if the IoT tag 200 operates within target parameters. Such parameters include a charging time at a predetermined value, or within a set range of a predetermined value. If so, the microcontroller 330 assigns a pass value to the IoT tag 200, e.g., within a database or within the tag itself. If not, a fail value is assigned to the tag.

For example, if the predetermined value is 1 second, a pass indication will be assigned to a tag if the BLE response signal is sent back within 1 second of the transmitted signal, thus indicating that the capacitor is configured to sufficiently charge within that timeframe to allow for transmission of a BLE signal. If it takes longer to harvest the energy and transform sufficient power to transmit a response signal, the tag is deemed to have failed the test. In a further embodiment, a range of an acceptable timeframe, e.g., 0.75-1.5 seconds, qualifies a tag for a pass assignment.

Figure 4:
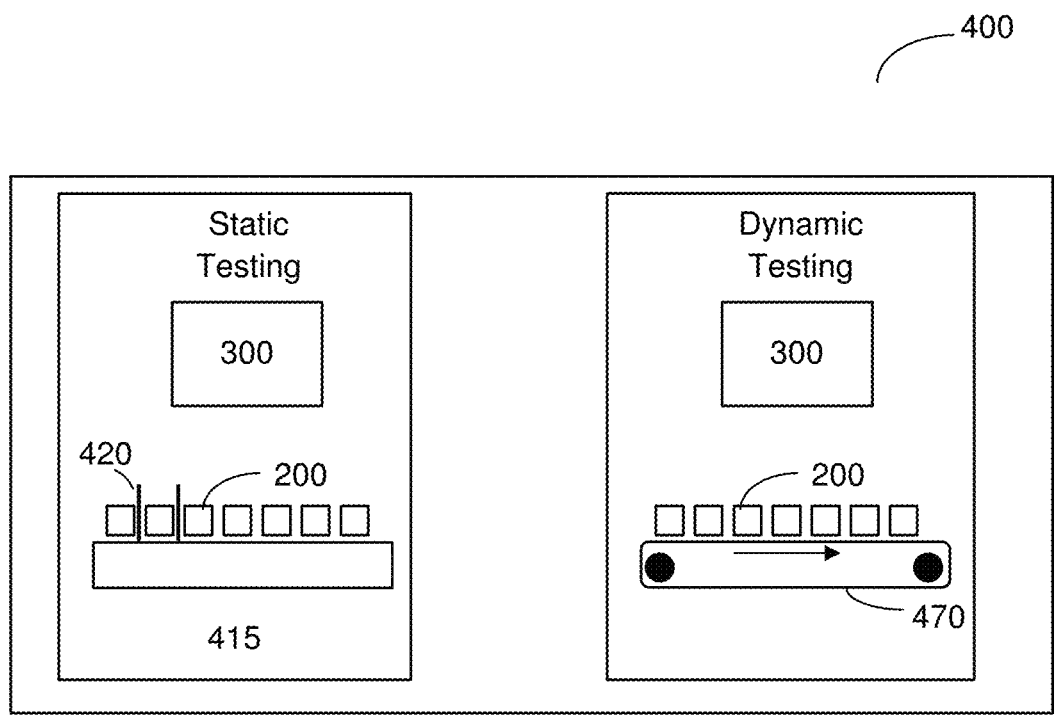
FIG. 4 is a schematic diagram of an IoT tag testing machine according to an embodiment.

FIG. 4 is a schematic diagram of an IoT tag testing machine 400 according to an embodiment. The testing machine 400 includes one or more testers 300 configured for static testing, for dynamic testing, or for both. In a static testing embodiment, the tester 300 is placed within a curing chamber 415, where one or more IoT tags 200 are assembled and cured therein. As noted above, the assembly includes etching or gluing an IoT tag's antennas and integrated circuit to the inlay. The IoT tag is stationary while testing is being conducted within the curing chamber 415.

The dynamic testing involves testing IoT tags 200 as they pass therethrough. In an embodiment, the dynamic testing includes placing multiple cured IoT tags 200 on a moving surface 470, such as a conveyor belt, where they pass by the tester 300 as each IoT tag 200 is tested.

In an embodiment, both the static and the dynamic testing include transmitting RF signals of either one specific frequency, or of a range of frequencies, and the RF signal receiver of the tester 300 receives signals transmitted from the IoT tag being tested, as discussed herein. The range of frequencies used may include frequencies sufficiently different from one another that adjacent or nearby IoT tags will not be significantly affected by a signal sent from the tester 300 intended for another tag. Additionally, in some embodiments the IoT tag testing machine 400 includes a physical separator 420 or mask configured to shield adjacent tags from nearby signals during testing.

Figure 5:
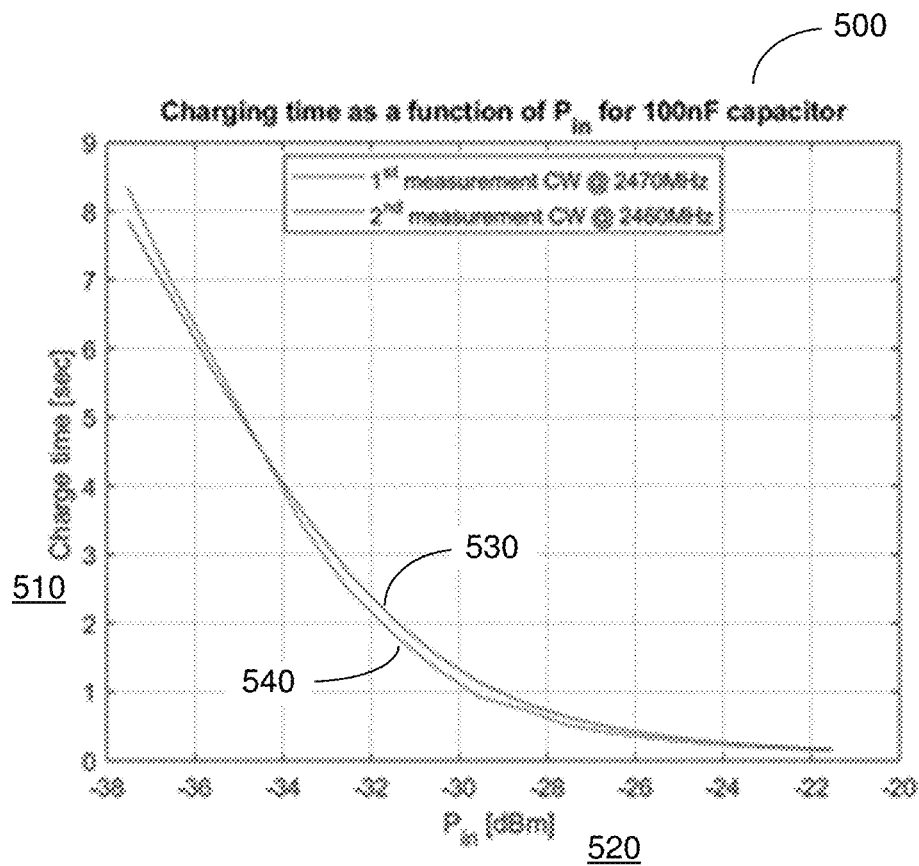
FIG. 5 is a graph of the charging time of a capacitor as a function of input power according to an embodiment.

FIG. 5 is an example graph 500 of the charging time 510 of a capacitor as a function of input power 520, measured in decibel milliwatts (dBm). The capacitor in this an example is a 100 nF capacitor. The charging time of the capacitor of an IoT tag is related to the input power at the antenna, which may be introduced to an IoT tag being tested by an energizing pulse from a tester 300. Typically, charging time is reduced exponentially as the input power increases.

As shown in FIG. 5, for an IoT tag having a power input of −22 dBm, the charging time is 0.1 seconds, while at −26 dBm that charging time is approximately 0.4 seconds. The graph 500 shows a first power measurement 530 taken by an antenna with a harvesting frequency of 2470 MHz, and a second power measurement 540 taken by an antenna with a harvesting frequency of 2460 MHz.

It should be noted that the relationship between the charging time 510 and input power 520 may change with a shift in frequency, as the first power measurement and second power measurement are not mere translations, but produce different charging time-to-power functions. These relationships may be predetermined and stored for retrieval during testing use, e.g., within a data table in a storage accessible to a testing unit.

An IoT tag may be manufactured for a specific use that requires a particular frequency to transmit signals and/or for harvesting energy. An example for such a frequency is the BLE frequency band. If, during testing, the charging time required for producing sufficient power to transmit a response signal is longer than expected, the antenna gain may be determined to be less than expected, and the tag would fail the test.

Returning to FIG. 4, the testing machine 400 is configured to test the harvesting antennas of an IoT tag 200 to determine if the antennas perform at their target operating frequency and charge the capacitor within a predetermined timeframe. For example, a testing machine 400 may be configured to test if an IoT tag 200 is capable of charging its capacitor within a predetermined timeframe, e.g., 1 second. If assembly of the IoT tag 200 was not performed correctly or if various antenna parameters deviate beyond predetermined antenna thresholds, the charging time will fall short, and the IoT tag 200 will not be able send a BLE response signal (packet).

The testing may further include detecting a measurement result or signal sent from the IoT tag 200 to a receiver of the tester 300 within the system 400. In an embodiment, the tester 300 is configured to measure the time between when a harvesting signal is sent from the tester 300, $T_1$, and when the IoT tag 200 transmits back a signal (e.g., a BLE packet), $T_2$. This time period is determined as the charging time of the capacitor to a capacitance level required for a response signal transmission.

In some embodiments, the IoT tag 200 may be configured to harvest energy at multiple frequency bands. To this end, the IoT tag 200 may be configured in advance regarding the order of energizing between frequency bands and antennas.

In an embodiment, these measurements include determining an input power that falls below a testing threshold that may be caused by unintended residual signals. The tester 300 within the testing machine 400 is configured to measure the input power and discard any measurement, e.g., of input power or charging time, that falls below the testing threshold and continue to disregard new measurements until a first measurement with a charging time beyond the testing threshold is detected.

In an embodiment, the testing machine 400 is configured to use the IoT tag 200 measurements to synchronize a test flow, including calibrating transmitted input power to match desired energy levels and charge for the capacitor. Based on predetermined expected time intervals between energizing pulses in different bands, the testing machine 400 is configured to discharge the capacitor after an expected charging time interval has elapsed, e.g., between a first energizing pulse and a second energizing pulse.

In this embodiment, the testing machine 400 is configured to synchronize the test flow based on analyzing the charging times of a capacitor. This allows for a quick and efficient test flow, but may be prone to misdetections caused by nearby residual energy of neighboring IoT tags. To resolve this, the testing machine 400 may be configured to precede each energizing pulse used during a test with a start or stop command sent to an IoT tag 200 directly. When a stop command is received by an IoT tag 200, for example, the tag is configured to discharge the capacitor from whatever the current capacity is, regardless of any charging capacitance met or not met. This allows a 'reset' of the IoT tags 200 to ensure accurate determination of charging times.

In an embodiment, the testing machine 400 is further configured to test the IoT tag's 200 transmission antenna, where the RF receiver of the tester 300 is configured to measure input power received from the TX signal sent by the IoT tag 200. As an example, the TX signal can be a BLE frame, a CW signal, and the like. The advantage of having an IoT tag 200 send a TX packet is that the packet can include a tag ID. The testing machine 400 can easily determine the order of the tag IDs, and use the order to filter out tag signals originating from nearby tags using residual energy.

In an embodiment, the testing machine 400 is configured to compare the received signal strength to an expected benchmark, and assign a 'pass' only to tags that meet or exceed that benchmark. The testing machine 400 can additionally check for frequency offsets from a nominal value.

In some cases, the testing machine 400 can receive unique calibration values associated with each tag from an external source, e.g., a connected storage. Such calibration values can be used to refine the pass/fail thresholds or benchmarks. For example, the external source can store the expected value of the received signal from each tag. This value can vary between tags, but can be calibrated and measured beforehand, e.g., during a chip wafer production. External source stored data may additionally be used for the harvesting test described above. In an embodiment, the external source is a cloud service.

In an embodiment, the testing machine 400 is configured to cause the IoT tag 200 to acknowledge successful receipt of data by programming the test result in its NVM (non-volatile memory). If such programming fails, the testing machine 400 may be configured to fail the IoT tag. Failed tags are marked and cataloged as such, e.g., in the external source. Further, the external source can remove such tags from a white list of allowed tags.

Figure 6:
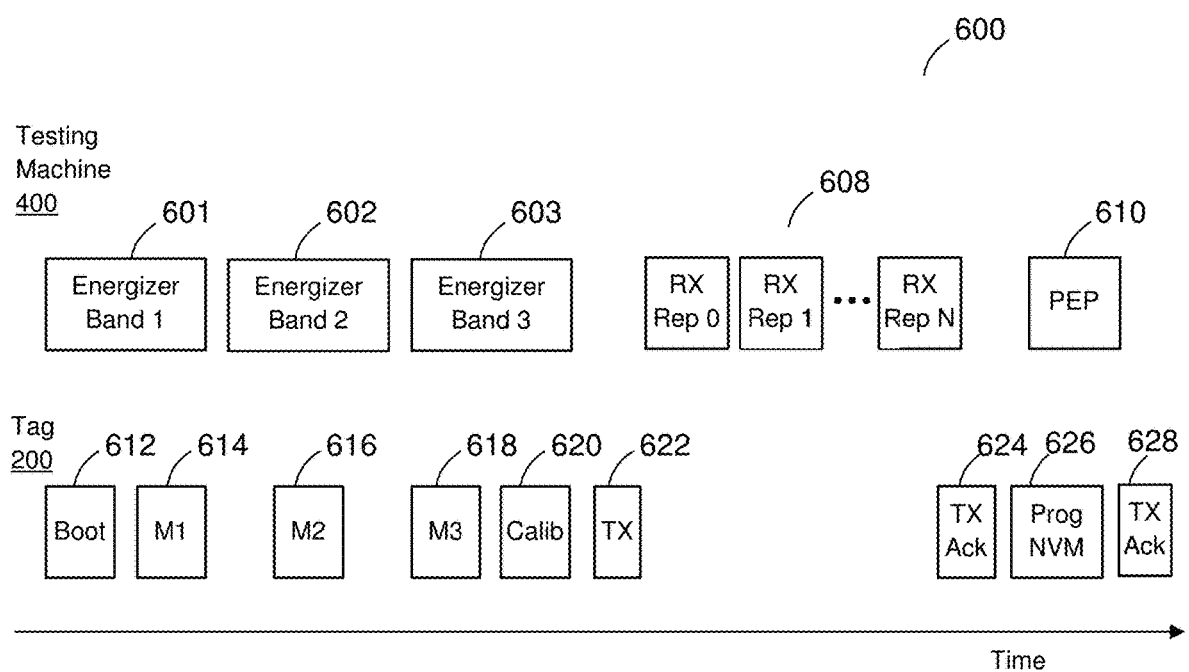
FIG. 6 is a schematic testing flow for testing an IoT tag and depicting the interaction between a testing machine and the IoT tag according to an embodiment.

FIG. 6 depicts a sample testing flow 600 for testing an IoT tag 200, and depicting the interaction between a testing machine 300 and the IoT tag 200. In the shown testing flow 600, three different energizer frequency bands 602, 604, 606 are charged by the transmitter of the testing machine 400 one by one and transmitted to the IoT tag 200 as an energizing pulse. The IoT tag 200 receives the pulses from each band, and a capacitor connected to the IoT tag 200 is charged. In an embodiment, the testing machine 400 is configured to determine the time required by the IoT tag 200 to charge the capacitor.

During the testing flow 600, the IoT tag 200 must maintain a minimal voltage on the capacitor such that a retention memory can function, and measurement data stored therein is not lost. For that to occur, the energizing pulses need to follow each other with short spacings between each successive event, such that energy stored on the capacitor of the IoT tag 200 does not leak out below a predefined retention threshold, after which the memory cannot retain information stored thereon.

In the example testing flow 600 shown, a first energizing pulse of energizer band 1 601 is sent by the testing machine 400 to initialize and boot 612 the IoT tag 200, as well as initiate a first measurement M1 614. A second energizing pulse is sent over energizer band 2 602 to initiate a second measurement M2 616, and a third energizing pulse is sent over energizer band 3 603 to initiate a third measurement M3 603. Each measurement involves determining how much energy is sent via the testing machine 400 and determining the amount of time required to charge the capacitor by each pulse.

In an embodiment, the third energizing pulse sent over the third energizer band 603 is additionally used for calibrating 620 the IoT tag 200 for transmission 622 of a signal back to the testing machine 400, which follows the calibration 620. The testing machine 400 receives one or more of the IoT tag response transmissions 608, labeled Rx Rep 0 to Rx Rep N, where N is an integer equal to or greater than 1. In an embodiment, the number of transmissions 608 received is dependent on how many measurements are performed on the IoT tag 200.

In an embodiment where multiple IoT tags 200 are tested in short succession, such as when the testing is performed by a dynamic tester as discussed above in FIG. 4, the energizer frequency bands used for testing a first tag are chosen to be different than the energizer frequency bands used to test an adjacent second tag. The testing unit may be configured to select energizer frequency bands such that energizing pulses used to test a first IoT tag are sufficiently different from the energizing pulses used to test an adjacent second IoT tag that minimal residual energy reaches an unintended IoT tag not currently being tested.

The testing machine 400 is then configured to determine if the IoT tag 200 has passed the test based on whether the power of the energizing pulses and the measurements of charging times indicate that the antennas of the IoT tag 200 are performing at their target operating frequency to allow the capacitor of the IoT tag 200 to charge sufficiently to transmit a response signal.

If an IoT tag 200 is determined to have passed the test, the testing machine 400 proceeds to program the IoT tag 200. This programming includes sending to and receiving from the IoT tag 200 an acknowledgment (ACK) 624 and sending a programming energy pulse (PEP) 610 that is used for programming the NVM of the IoT tag 200. The IoT tag 200 is further configured to send back an acknowledgment 628 to the testing machine 400, confirming successful programming of the IoT tag 200. In an embodiment, the test is deemed fully passed only when the final programming acknowledgment is received, while in further embodiments a pass is assigned after determination that the IoT tag 200 successfully transmits a response signal.

Figure 7:
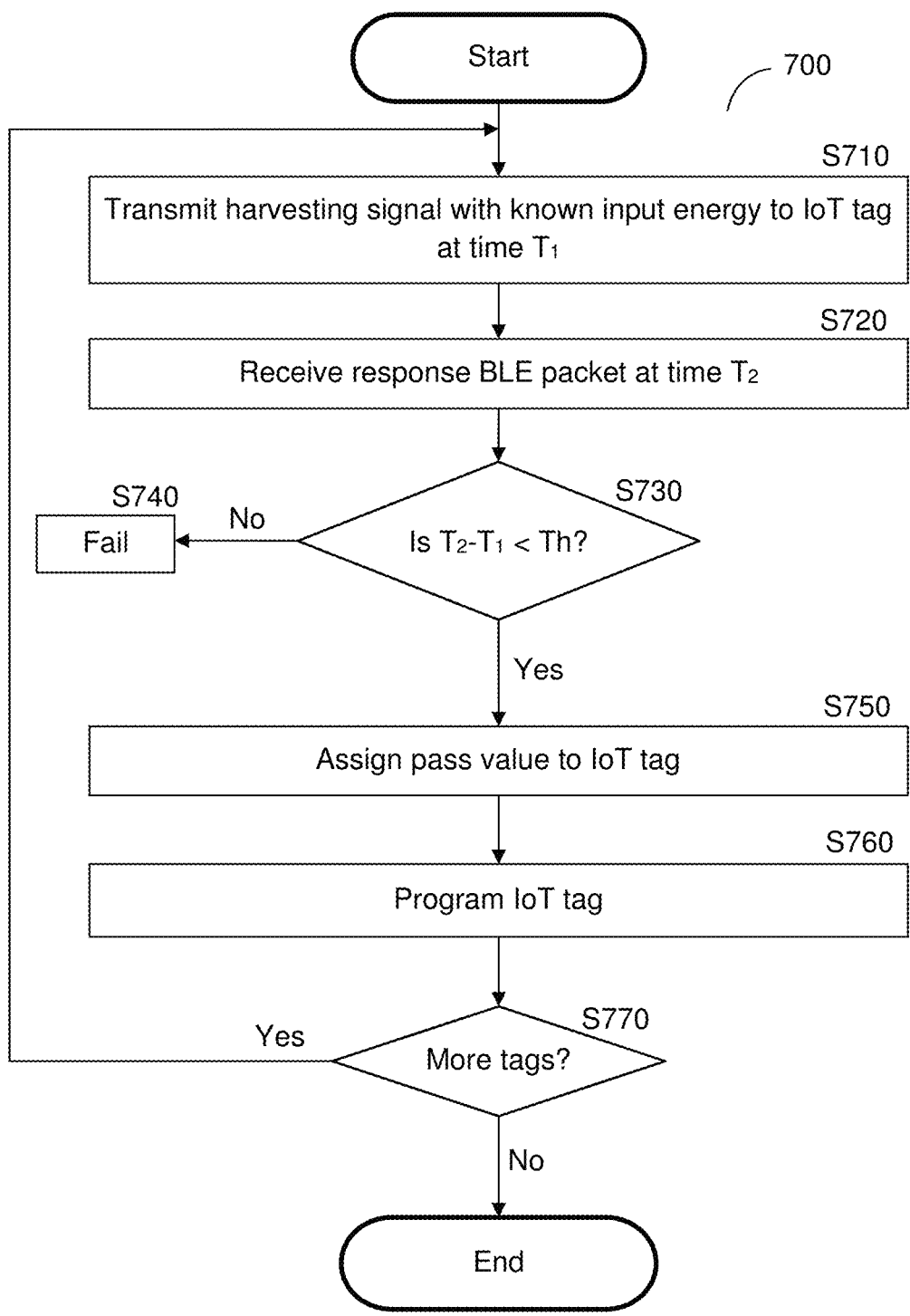
FIG. 7 is an example flowchart illustrating a method of testing energy harvesting IoT tags according to an embodiment.

FIG. 7 is an example flowchart 700 illustrating a method for testing energy harvesting IoT tags according to an embodiment. The testing includes determining if an IoT tag is capable of harvesting RF signals within a predetermine timeframe to charge a capacitor with enough power to transmit a response BLE signal.

At S710, a harvesting signal with a known input energy is sent to an IoT tag at time $T_1$. In an embodiment, the IoT tag includes one or more harvesting antennas, where each harvesting antenna is configured to operate at a harvesting frequency band. In a further embodiment, the IoT tag additionally includes a receiving antenna and/or a transmitting antenna, each of which operate at their respective frequencies.

In some embodiments, multiple frequencies are sent to one or more IoT tags simultaneously, were the multiple frequencies are chosen to minimize residual signals from affecting adjacent or nearby IoT tags.

At S720, a response is received from the IoT tag at time $T_2$. In an embodiment, the response is a BLE signal or packet sent from the IoT tag using power from a capacitor charged using the harvesting signal.

At S730, a charging time is calculated as $T_2-T_1$, and it is determined if the charging time is less than a predetermined threshold. The threshold may include a predefined timeframe, e.g., 1 second, or a predetermined range, e.g., 0.75-1.5 seconds. If the charging time exceeds the threshold, the tag is assigned a failed status at S740. If the charging time is equal to or less than the threshold, the operation continues at S750.

At S750, a pass indication is assigned to the IoT tag. In an embodiment, the pass indication is stored together with an ID of the tag being tested in a database for future reference.

At optional S760, the IoT tag is programmed to indicate that the IoT tag has been assigned a pass value. The assignment may be stored within an on-tag memory, e.g., an NVM for future reference. In an embodiment, a pass value is not assigned to the IoT tag when the pass value cannot be successfully programmed within the memory.

At S770, it is determined if additional tags are to be tested. If so, execution continues at S710, otherwise execution ends.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for testing an energy harvesting tag, comprising:
   transmitting, from a tester, a harvesting signal to an energy harvesting tag at time $T_1$;
   receiving, by the tester, a response signal from the energy harvesting tag at time $T_2$;
   determining, by the tester, an energy harvesting storage capacitor charging time of the energy harvesting tag as a difference between $T_2$ and $T_1$; and
   assigning, by the tester, a pass value to the energy harvesting tag when the capacitor charging time is less than a predetermined threshold amount.

2. The method of claim 1, wherein the harvesting signal is an energizing pulse having a known input energy.

3. The method of claim 2, further comprising:
   determining a harvesting frequency of the energy harvesting tag based on the capacitor charging time and the known input energy.

4. The method of claim 1, wherein the capacitor charging time is the time required to charge the capacitor until a predetermined charging capacitance is reached.

5. The method of claim 4, wherein the predetermined charging capacitance is a capacitance with sufficient power to allow the energy harvesting tag to transmit the response signal.

6. The method of claim 1, further comprising:
programming the pass value within a memory of the energy harvesting tag.

7. The method of claim 6, wherein a pass value is not assigned to the energy harvesting tag when the pass value cannot be successfully programmed within the memory.

8. The method of claim 1, further comprising:
discharging the capacitor between a first harvesting signal and a second harvesting signal.

9. The method of claim 1, further comprising:
sending a stop command to the energy harvesting tag prior to sending the harvesting signal, where the stop command causes the capacitor to discharge.

10. The method of claim 1, further comprising:
comparing the received response signal to an expected benchmark, wherein the pass value is assigned to the energy harvesting tag only if the response signal meets the expected benchmark.

11. The method of claim 1, wherein the received response signal is at least a BLE packet.

12. The method of claim 1, further comprising:
assigning a fail value to the energy harvesting tag when no response signal is received.

13. The method of claim 1, wherein the testing of an energy harvesting tag is any one of: a dynamic testing and a static testing.

14. The method of claim 1, wherein the energy harvesting tag is at least a battery-free internet of things (IoT) tag, including at least an integrated circuitry, at least one harvesting antenna, and at least one transmitting antenna.

15. A non-transitory computer readable medium having stored thereon instructions for causing a processing circuitry of a tester to perform a process, the process comprising:
transmitting, from the tester, a harvesting signal to an energy harvesting tag at time $T_1$;
receiving, by the tester, a response signal from the energy harvesting tag at time $T_2$;
determining, by the tester, an energy harvesting storage capacitor charging time of the energy harvesting tag as a difference between $T_2$ and $T_1$; and
assigning, by the tester, a pass value to the energy harvesting tag when the capacitor charging time is less than a predetermined threshold amount.

16. A system for testing an energy harvesting tag, comprising:
a transmitter configured to transmit a harvesting signal;
a receiver configured to receive a response signal;
a processing circuitry; and
a memory, the memory containing instructions that, when executed by the processing circuitry, configure the system to:
transmit, from the system, the harvesting signal to an energy harvesting tag at time $T_1$;
receive, by the system, the response signal from the energy harvesting tag at time $T_2$;
determine, by the system, an energy harvesting storage capacitor charging time of the energy harvesting tag as a difference between $T_2$ and $T_1$; and
assign, by the system, a pass value to the energy harvesting tag when the capacitor charging time is less than a predetermined threshold amount.

17. The system of claim 16, further comprising:
a curing chamber configured for assembly of the energy harvesting tag, wherein the energy harvesting tag is stationary within the curing chamber while being tested.

18. The system of claim 16, further comprising:
a moving surface, wherein one or more energy harvesting tags are placed on the moving surface while being tested.

19. The system of claim 16, wherein the transmitter is further configured to transmit harvesting signals with different frequencies to adjacent energy harvesting tags.

20. The system of claim 16, further comprising:
at least one physical separator to shield adjacent energy harvesting tags from unintended nearby harvesting signals.

* * * * *